(12) United States Patent
Collard et al.

(10) Patent No.: US 8,392,900 B1
(45) Date of Patent: Mar. 5, 2013

(54) METHODS AND SYSTEMS FOR BARRIER REDUCTION IN PARALLEL PROCESSING SYSTEMS

(75) Inventors: Jean-Francois Collard, Sunnyvale, CA (US); Robert Schreiber, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2256 days.

(21) Appl. No.: 11/082,321

(22) Filed: Mar. 17, 2005

(51) Int. Cl.
*G06F 9/45* (2006.01)
(52) U.S. Cl. ...................................................... 717/159
(58) Field of Classification Search ........... 717/140–159
See application file for complete search history.

(56) References Cited

U.S. PATENT DOCUMENTS

| | | | | |
|---|---|---|---|---|
| 5,535,394 | A * | 7/1996 | Burke et al. ................. | 717/157 |
| 5,781,775 | A * | 7/1998 | Ueno ........................... | 718/102 |
| 5,802,374 | A * | 9/1998 | Gupta et al. ................. | 717/149 |
| 5,873,105 | A * | 2/1999 | Tremblay et al. ............ | 707/206 |
| 5,953,736 | A * | 9/1999 | O'Connor et al. ........... | 711/6 |
| 6,016,505 | A * | 1/2000 | Badovinatz et al. ......... | 709/205 |
| 6,081,665 | A * | 6/2000 | Nilsen et al. ................ | 717/116 |
| 6,173,444 | B1 * | 1/2001 | Archambault ............... | 717/159 |
| 6,216,174 | B1 * | 4/2001 | Scott et al. .................. | 713/375 |
| 6,292,939 | B1 * | 9/2001 | Itou et al. .................... | 717/149 |
| 7,200,738 | B2 * | 4/2007 | Crook et al. ................. | 712/219 |
| 2001/0047511 | A1 * | 11/2001 | Itou et al. ...................... | 717/6 |

OTHER PUBLICATIONS

Acharya, A., "Eliminating Redundant Barrier Synchronizations in Rule-based Programs," ICS '96, 1996, pp. 325-332, Philadelphia, PA, USA.
Andert, E., "A Simulation of Dynamic Task Allocation in a Distributed Computer System," Proceedings of the 1987 Winter Simulation Conference, 1987, pp. 768-776.
Tseng, C., "Compiler Optimizations for Eliminating Barrier Synchronization," PPOPP '95, 1995, pp. 144-155, Santa Clara, CA, USA.
Arvind, S., et al., "Semantics of Barriers in a Non-Strict, Implicitly-Parallel Language," FPCA '95, 1995, pp. 204-215, La Jolla, CA, USA.
Tzeng, N., et al., "Distributed Shared Memory Systems with Improved Barrier Synchronization and Data Transfer," ICS '97, 1997, pp. 148-155, Vienna, Austria.

\* cited by examiner

*Primary Examiner* — Anna Deng

(57) ABSTRACT

Systems and methods according to the present invention provide techniques which modify programs having barrier statements. Dependence relations between statements, and enforcement associations between the barrier statements and the dependence relations, in the program are identified. The dependence relations are classified as being either enforceable by point-to-point synchronization or not enforceable by point-to-point synchronization. A subset of the barrier statements, which will enforce those dependence relations that are unenforceable by point-to-point synchronization, are determined. Other(s) of the barrier statements are replaced with a point-to-point synchronization routine.

20 Claims, 6 Drawing Sheets

| VARIABLE/OPERATOR NAME | DESCRIPTION |
| --- | --- |
| S | A STATEMENT IN A PARALLEL PROGRAM. |
| Me | THREAD ID VALUE VARIABLE. |
| I | LOOP COUNTER VECTOR VALUE. |
| P | NUMBER OF THREADS. |
| II(s) | A SPECIFIC THREAD. |
| I(S) | THE SET OF INSTANCES OF S, ALSO REFERRED TO AS THE ITERATION DOMAIN. |
| I | THE UNION OF ALL I(S)s FOR ALL STATEMENTS. |
| < | EXECUTES BEFORE. |
| ~ | SYNCHRONIZES WITH (FOR TWO INSTANCES OF A BARRIER) |
| D | A SET OF DEPENDENCE RELATIONSHIPS ASSOCIATED WITH A PROGRAM. |
| H | THE SET D TRANSITIVELY REDUCED AND MINUS INTRA-THREAD DEPENDENCES. |
| Se | A SEMAPHORE VARIABLE USED IN POINT-TO-POINT SYNCHRONIZATION. |
| R(e) | A SET OF CONDITIONS UNDER WHICH A BARRIER B ENFORCES A DEPENDENCE ASSOCIATED WITH LINE e. |

FIG. 2

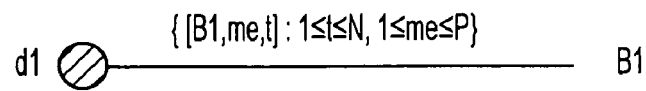
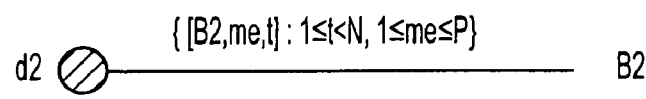
FIG. 3
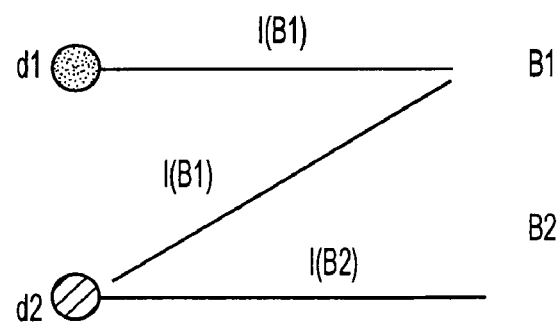
FIG. 4

METHODS AND SYSTEMS FOR BARRIER REDUCTION IN PARALLEL PROCESSING SYSTEMS

BACKGROUND

The present invention relates generally to parallel processing systems and methods and, more particularly, to systems and methods for parallel processing which optimize the usage of barrier instructions.

Microprocessors, including general purpose microprocessors and digital signal processors (DSPs), are ubiquitous in today's society. Many different types of products incorporate microprocessors, including personal computers, toys and cars just to name a few. As microprocessors have evolved in their complexity, so too has the level of sophistication of software programs and the manner in which such programs and processors interact. Parallel processing refers to, for example, techniques for executing different parts of a software program at the same time using two or more microprocessors operating in parallel. Using parallel processing, a program can be executed more quickly than if it were executed on a single processor of the same type and/or more cheaply than if it were executed on a single processor having greater processing capabilities than the individual processors operating in parallel. Other forms of parallel processing involve running the same program on multiple processors against different data sets (single program, multiple data or SPMD).

When a program is developed for execution on parallel processors, one issue confronted by system designers and programmers is synchronizing the execution of the different parts of the program between the processors. For example, a result obtained by processor A in executing its part of the program may be needed by processor B to execute its part of the program. A barrier can be added to the program to ensure that each of the parallel processors or threads stops at the barrier until all other processors/threads have reached that point in the program. This creates a synchronization point for the program. Other kinds of synchronization are also available. For example, in point-to-point synchronization, a first processor can be made to wait until a second processor indicates that it is now allowable for the first processor to proceed. Barriers are often used to create synchronization points because (1) they are conceptually simple, (2) they are the only synchronization method provided as a built-in primitive by some languages (e.g., UPC), and/or (3) correct point-to-point synchronizations are not easy to write. Because of their simplicity, barriers are often used in cases where other synchronization techniques, e.g., point-to-point synchronization, would be sufficient. However, barriers hinder program performance because they result in one or more processors waiting at a barrier for another processor to catch up.

To better understand the issues associated with barriers, consider the following:

Code Example 1

```
for t = 1 to N {
T A[me] = ..;
B1 barrier;
U ... = A[me-1];
B2 barrier;
}
```

In the examples described herein, the SPMD model is used, wherein there are P threads numbered from 1 to P, each executing the same code, although the invention is not so limited. Before executing statement U in code example 1 above, each thread waits at the first barrier B1 for all threads to complete statement T. This is necessary because of the dependence from T to U, i.e., statement T produces values in array A that statement U later uses. Similarly, before starting a new iteration of this code, and re-executing statement T, each thread waits at the second barrier B1. This ensures that all threads finish reading array A in statement U before the data are overwritten in the next iteration of statement T.

The parallel program in code example 1 is oversynchronized by virtue of using two barrier instructions. Both barrier instructions in code example 1 enforce dependences which have simple, regular patterns. For example, the values that thread "me" produces in statement T are consumed by its neighbor thread "me+1." Likewise, thread "me" must be given the time to read array A in statement U before its neighbor thread "me-1" overwrites the data. This type of program behavior can be synchronized using other techniques that are more efficient than using barrier statements alone. One such technique is point-to-point synchronization, in which, for each datum produced and consumed, the synchronization is limited to two threads, the thread producing the datum and the thread consuming the datum.

Accordingly, it would be desirable to provide techniques and devices which automatically replace unnecessary barriers in programs to improve program execution performance.

SUMMARY

Methods, products and systems described herein provide, among other things, techniques for replacing barriers with point-to-point synchronization routines in order to enforce selected dependences. According to an exemplary embodiment of the present invention, a method for modifying a program having a plurality of barrier statements includes the steps of identifying dependence relations between statements in the program, and enforcement associations between said barrier statements and said dependence relations, classifying the dependence relations as being either of a first type, which are enforceable by point-to-point synchronization, or of a second type, which are not enforceable by point-to-point synchronization, determining a subset of the plurality of barrier statements which will enforce the second type of dependence relations and replacing at least one of the plurality of barrier statements, which is not in the subset, with a point-to-point synchronization.

According to another exemplary embodiment of the present invention, a system for modifying a source program having a plurality of barrier statements includes a set of data structures which identify dependence relations between statements in the program and enforcement associations between the barrier statements and the dependence relations, and a processor operating on the set of data structures to classify the dependence relations as being either of a first type, which are enforceable by point-to-point synchronization, or of a second type, which are not enforceable by point-to-point synchronization, to determine a subset of the plurality of barrier statements which will enforce the second type of dependence relations and to replace at least one of the plurality of barrier statements, which is not in the subset, with a point-to-point synchronization routine.

BRIEF DESCRIPTION OF THE DRAWINGS

The accompanying drawings illustrate exemplary embodiments of the present invention, wherein:

FIG. 2 is a table showing various notations used in this specification;

FIGS. 3 and 4 are barrier-dependence graphs according to exemplary embodiments of the present invention;

DETAILED DESCRIPTION

Figure 1:
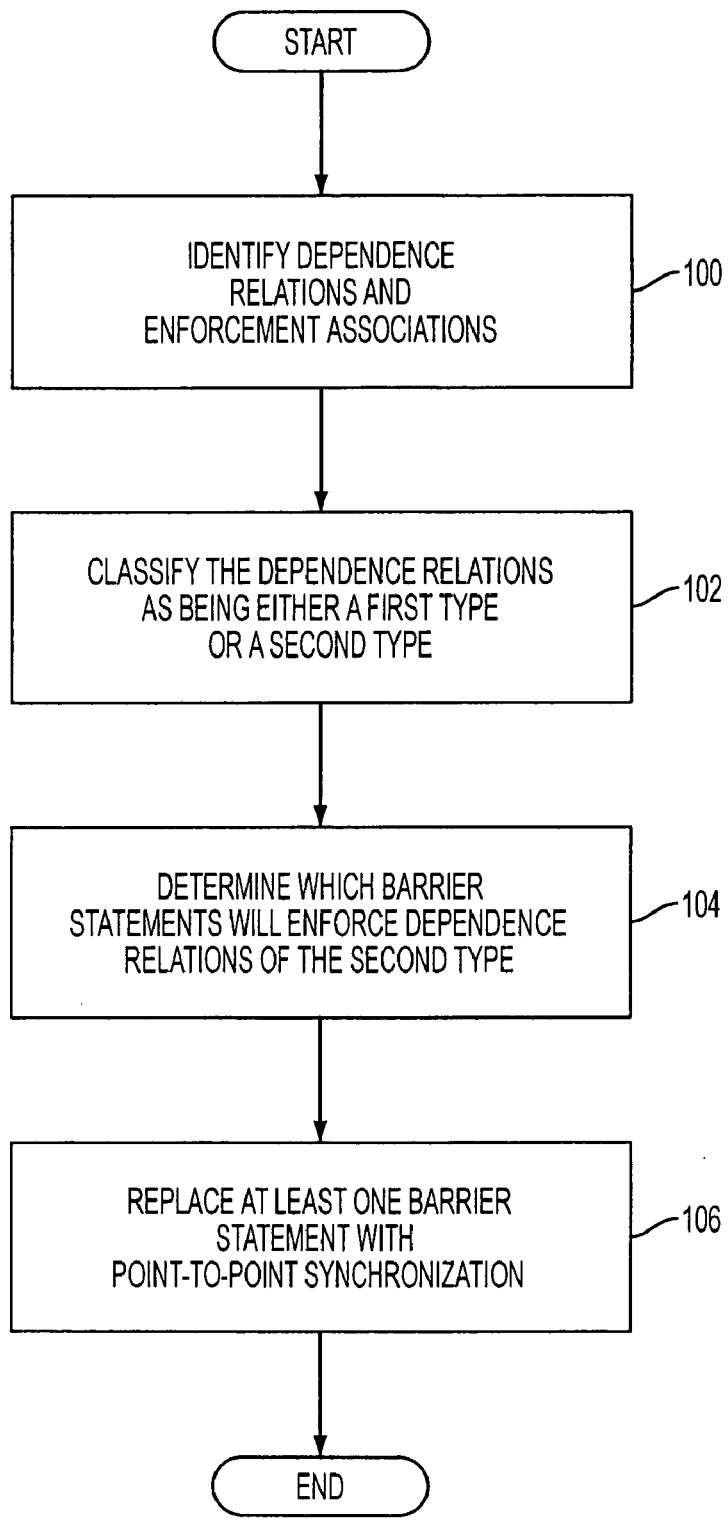
FIG. 1 is a flowchart illustrating a method of modifying a program in accordance with exemplary embodiments of the present invention.

The following detailed description of the invention refers to the accompanying drawings. The same reference numbers in different drawings identify the same or similar elements. Also, the following detailed description does not limit the invention. Instead, the scope of the invention is defined by the appended claims.

According to exemplary embodiments of the present invention, various techniques and mechanisms are described to evaluate barrier statements in a program and to then selectively replace or preserve each barrier statement. This can be performed, for example, in a program compiler. As discussed in the Background section with respect to code example 1, certain threads in programs exhibit regular dependence relationships between thread operations such that it would be beneficial to synchronize those threads using techniques other than barriers, e.g., point-to-point synchronization techniques. Dependence relationships enforced by barrier statements in an original program which can be replaced by, e.g., point-to-point synchronization techniques, are referred to herein as "softenable" dependences.

Point-to-point synchronization can, for example, be implemented with a shared Boolean variable called a semaphore and two operations: Notify and Wait. Wait(Se) forces the program to wait until semaphore Se is set True (Se is initially False), whereas Notify(Se) sets semaphore Se to True. For this example assume that there is one semaphore per pair of distinct threads, e.g., the semaphore that synchronizes threads p and p' is denoted Semaphore[p,p']. Thus, according to exemplary embodiments of the present invention, code example 1 can be rewritten to replace the barrier statements in with point-to-point synchronization as shown below.

Code Example 2

```
for t =1 to N {
    if (t>1 and me < P)
Wait(Semaphore[me+1,me]);
    A[me] = . . . ;
    if (me<P) Notify(Semaphore[me,me+1]);
    if (me>1) Wait(Semaphore[me-1,me]);
    . . . = A[me-1];
    if (t<N and me>1) Notify (Semaphore[me,me-
1]);
    )
```

This program modification is likely to speed up execution for two reasons. In code example 2, thread me waits only for thread me−1 and thread me+1, while in code example 1, all threads wait (at each barrier) for every other thread. Secondly, the communication delay engendered by a barrier is necessarily a growing function of the number of parallel threads that are synchronized, while a point-to-point synchronization, involving only two threads, can be performed quickly, independent of the total number of threads involved in the computation. Note that, depending on the implementation of the Notify operation, the conditionals if (me<P) and if (t<N and me>1) set forth in code example 2 may or may not be necessary for correctness.

However, not all program code exhibits the regular relationships between threads which render barrier replacement beneficial. Consider the following:

Code Example 3

```
for t = 1 to N {
T . . = wave [me+1];
B1 barrier;
U wave [me] = . . ;
B2 barrier;
}
if (me == 1) {
    for k = 1 to P {
V . . = wave [k];
    }
}
```

Therein, the loop on t in code example 3 is similar to that of code example 1, except that statement T is now the consumer of values and statement U is now the producer of values. Barrier statements B1 and B2 play the same role with respect to statements T and U as in code example 1. However, now consider the loop on k and statement V. Because of the conditional if (me==1), these statements are executed only by thread 1. Thread 1 can only read these values after all threads produce data in statement U. Therefore, barrier B2 plays a second role with respect to the loop on k, i.e., not only does barrier B2 enforce the dependence from U to T (across iterations of the t loop), but it also enforces dependences from U to V. Moreover, the dependences from U to T and from T to U are, as in the previous example, softenable. Thus barrier B1, which enforces only the softenable dependence from T to U, may be replaced.

Replacement of barrier B1 is permissible because, at each iteration, barrier B1 enforces dependences from thread "me" to thread "me−1", which is a regular pattern involving only two threads, and so can be enforced by point-to-point synchronization instead of a barrier. However, the dependence from U to V makes all threads wait for thread 1 only. This many-to-one type of dependence is not amenable to softening and, therefore, is identified by exemplary embodiments of the present invention during program evaluation so that a barrier is preserved (either maintained in its original position within the program or moved out of loop t so that it executes only once) to enforce the nonsoftenable dependence relationship.

Having provided some code which illustrates individual examples wherein barrier statements should (or should not) be replaced with point-to-point synchronization techniques, exemplary embodiments of the present invention will now be described wherein programs are automatically evaluated and modified to selectively replace such barrier statements. An overview of a method according to an exemplary embodiment of the present invention is provided as FIG. 1. Therein, at step 100, the dependence relations associated with a program being evaluated are identified. Note that exemplary embodiments of the present invention can operate on all of the dependence relations which exist in a program or, alternatively, can operate on a subset of the existing dependence relations. Exemplary techniques according to the present invention for determining subsets of the dependence relations in a program being evaluated are described below under the heading "Transitive Reduction". In addition to identifying some or all of the dependence relations in the program under evaluation, the enforcement associations between the dependence relations and the barrier statements in the program are also identified at step 100.

Next, at step 102, the identified dependence relations are each classified as being either of a first type which are enforceable by point-to-point synchronization (softenable) or of a second type which are not enforceable by point-to-point synchronization (nonsoftenable). Then, the nonsoftenable dependence relations are further evaluated at step 104 to determine, for example, which barrier statements to preserve (or move) in the program under evaluation to enforce the nonsoftenable dependence relations. As will be described in more detail below, according to exemplary embodiments of the present invention, it is beneficial to first selectively preserve barrier statements associated with nonsoftenable dependence relations, prior to selectively replacing other barrier statements associated with softenable dependence relations. This latter step is illustrated as block 106 in FIG. 1, wherein at least one barrier statement is replaced with a point-to-point synchronization. Each of the steps in FIG. 1 will now be described in greater detail.

To automate the process described in the flowchart of FIG. 1, exemplary embodiments of the present invention create a mathematical model of a program to be evaluated and use the model to perform the steps described above. To describe this process in detail, certain notation is used herein, a summary of which is provided in the table attached hereto as FIG. 2. A lengthier description of the notation used herein is provided at the end of this specification under the heading "Notation".

The mathematical definition of a relation is a set of ordered pairs. In this specification the notation x→y is used to denote the ordered pair of objects x and y, and the notation {x→y: conditions on x and y} is used to denote a parametric set of ordered pairs of objects, or a relation. Dependences between statement instances in a parallel program can be described using relations. For instance, the relation:

$$d1=\{[T,me,t] \rightarrow [U,me+1,t']:1 \leq me<P,1 \leq t \leq t' \leq N\}$$

captures a set of dependences from instances of T to instances of U from code example 1. In that same program, the other two dependence relations are:

$$d2=\{[U,me,t] \rightarrow [T,me-1,t']:1 \leq me \leq P,1 \leq t<t' \leq N\},$$

and $$d3=\{[T,me,t] \rightarrow [T,me,t']:1 \leq me \leq P,1 \leq t<t \leq N\}.$$

To identify and capture the enforcement association between barrier statements and dependence relations, exemplary embodiments of the present invention use barrier-dependence graphs. A barrier-dependence graph conveys an enforcement association between a dependence relation and a barrier statement if the barrier enforces the dependence relation. More specifically, for example, dependence relation d is associated with barrier statement B if every instance of the relation d is enforced by some instance of the barrier B. As described in more detail below, exemplary embodiments of the present invention need not capture all dependence relations found in a particular program in the barrier-dependence graph. For example, a subset of dependence relations can be formed from a set of transitively reduced dependence relations, from which are removed any intra-thread dependences. The operative set of dependence relations used in a barrier-dependence graph is denoted H herein.

Consider an exemplary barrier-dependence graph associated with code example 1 as shown in FIG. 3. Therein, the vertices d1 and d2 are the two dependence relations of H, which are both represented by shaded circles, and the two barriers B1 and B2. The two edges connecting the vertices with their respective barrier statements graphically represent the enforcement associations and are annotated with a set that indicates under what conditions a barrier statement actually enforces the dependence relation. In this example, the set of instances of the barrier B1 that enforce an instance of the dependence relation d1 is $$\{[B1,me,t]:1 \leq me<P,1 \leq t \leq N\}$$

and the set of instances of barrier B2 that enforce dependence relation d2 is $$\{[B2,me,t]:1 \leq me<P,1 \leq t<N\}.$$

The vertices labeled d1 and d2 in FIG. 3 are represented by shaded circles because, as described above during the discussion of code example 1, the dependence relations are of the type that enables barrier B1 and/or barrier B2 to be softened by, e.g., replacing one or both with point-to-point synchronizations. Dependence relations which are not softenable are identified in barrier-dependence graphs according to these exemplary embodiments using filled-in circles as shown, for example, in the graph of FIG. 4. Therein, dependence relation d1 is enforced by a nonsoftenable barrier statement B1 and dependence relation d2 is enforced by barrier B1 or B2. In this exemplary usage of barrier-dependence graphs, a barrier statement enforces all instances of the dependence relation to which they are associated and to further simplify this example each edge (association) is annotated with the entire iteration domain of its associated barrier statement.

According to exemplary embodiments of the present invention, a compiler constructs appropriate data structures to represent this bipartite graph for each program to be analyzed and modified. In one exemplary embodiment, the compiler maintains two lists of vertices and a list of enforcement associations as the data structures which represent the bipartite graph. The first list of vertices contains, for example, the transitively reduced set H of inter-thread dependences and the second list of vertices contains the set B of barrier statements. The list of enforcement associations contains pairs of vertices (one from each of the two lists) representing the compiler's determination that an instance of a barrier enforces a subset of the dependence relation. Mathematically, the compiler can determine a barrier-dependence graph G as G=(H ∪ B, E), where E is determined as:

$$E=\{(d,b):d \in H, b \in B: \forall (m,n) \in d, \exists q E \in (B), m<q<n\}$$

Figure 5:
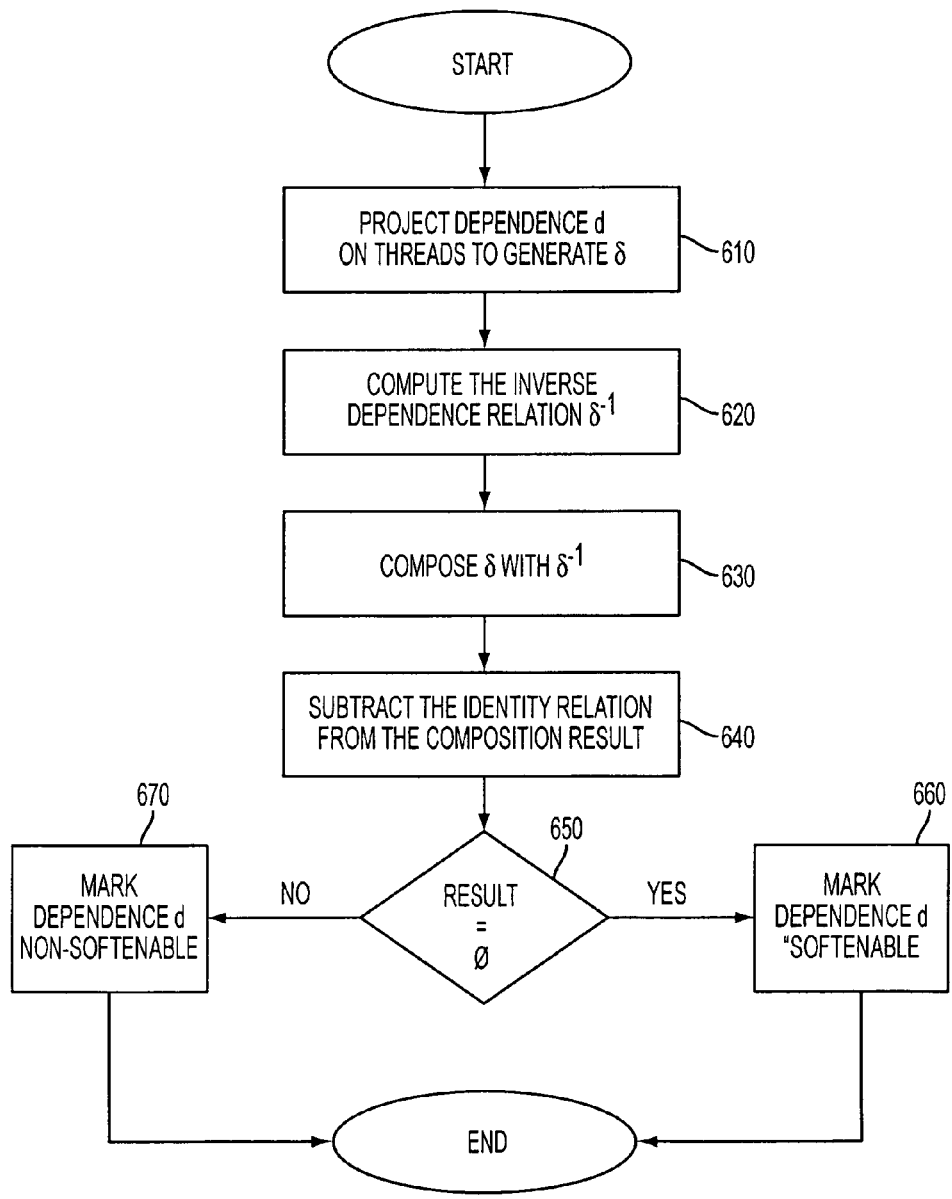
FIG. 5 is a flowchart illustrating one step of the method of FIG. 1 in more detail.

Referring again to the flowchart of FIG. 1, once the compiler has identified and captured the dependence relations and enforcement associations associated with a program (step 100), the next step 102 is to classify each dependence relation as softenable or nonsoftenable. According to exemplary embodiments of the present invention this classification can be performed by projecting the dependence relation onto each thread in the parallel program to generate a projection relation, and determining, for each thread in the projection relation, whether there is at most one other thread on which that thread depends. If so, the dependence relation is identified as softenable and, otherwise, the dependence relation is identified as nonsoftenable. Various techniques can be used to perform this process, one of which is illustrated in the flowchart of FIG. 5.

Therein, at step 610, the dependence relation d being evaluated is projected onto each of the threads in the parallel program. Projecting a dependence onto the threads can be performed by constructing a projection relation $\delta=\{p \rightarrow p': \exists m, n: (m,n) \in d, p=\pi(m), p'=\pi(n)\}$. Next, the inverse $\delta^{-1}$ of the projection relation is computed at step 620. Then, the projection relation $\delta$ is composed with its inverse $\delta^{-1}$. If the dependence relation possesses the regular, "one-to-one" thread relationship described above, then subtracting the composition result generated in step 630 with the identity relation at step 640 should result in the zero relation at step 650. If so, then the flow follows the path to step 660 wherein the dependence relation d is marked as softenable. Otherwise, if the result of 640 is not the zero relation, then the flow follows the path to step 670 and the dependence relation d is marked as nonsoftenable.

The representation and manipulation of relations, including the determination of projected relations, relation inverses, and compositions (also called joins) of relations, can be performed using a number of different techniques. Relations that can be described by Presburger formulas are an example of a class of relations that can be used to describe the dependence relations in programs being evaluated and which can be represented and manipulated by software in the manner described above with respect to FIG. 5. One software implementation which implements representation and manipulation of relations described by Presburger formulas (albeit not for the purpose of removing barrier instructions) is the Omega system developed by the University of Maryland.

Returning to FIG. 1, once each dependence relation has been evaluated to determine whether it is softenable or not, the flow moves on to step 104. Therein, each nonsoftenable dependence relation is further evaluated to determine which barrier statement(s) should be selected to enforce the instances of that dependence relation. This step can, for example, be performed, by the steps illustrated in the flow chart of FIG. 6. Therein, an enforcement association (edge) e associated with a nonsoftenable dependence relation d and a barrier statement B is selected for evaluation. At step 700 the variable x is set to be an element of the iteration vector of the barrier B. The code snippet "if $x \in R(e)$ then barrier;" is inserted into the program being evaluated after the barrier statement B at step 710. The variable x represents the index vectors of the loops that contain the barrier B, and as mentioned above for a given enforcement association e, R(e) is the set of values of the iteration vector x of B for which B enforces the dependence relation d.

At step 720, for every edge e which is connected to barrier B, the set of conditions (R(e)) under which barrier B enforces dependence d is subtracted from the set(s) of conditions (R(e')) under which barrier B enforces other dependences d'. At step 730, all instance pairs whose dependence is enforced by an instance of B are removed from every dependence relation d' (including d) that is connected by an edge to B in the barrier-dependence graph. To do this, each such dependence relation is updated and replaced by $d' \setminus \{(m,n): \exists\, b \in R(e), m<b<n\}$. This step eliminates unnecessary enforcement by other barriers of the dependence d'. If, after updating, dependence d' is empty at step 740, then the vertex associated with dependence d' (and adjacent edges) are removed from the graph at step 760. Otherwise, if dependence d' is not empty, then any other barrier enforcing d' (or part of d') may be redundant or partially redundant relative to the barrier inserted by step 710. Accordingly, at step 750, for edges e" associated with dependence d' from d' to a barrier other than B, the set of values R(e") are updated by removing instance pairs that are already enforced by B, i.e. by calculating:

$$\{b":b" \in R(e"): \exists (m,n) \in d', m<b"<n \text{ and } \neg\, \exists b \in R(e), m<b<n\}.$$

At step 770, if any of the resulting set(s) R(e') are empty, then the corresponding edge e' can be removed from the graph. Then, the edge e is removed from the barrier-dependence graph at step 7800, e.g., by marking or deleting the corresponding entry in the association list managed by the compiler.

To gain a better understanding of the results of the foregoing process, consider again the barrier-dependence relation graph of FIG. 4. Therein, since dependence relation d1 is not softenable, and B1 is the only barrier statement that can enforce (has an edge to) dependence d1, the compiler will maintain barrier B1 by performing the steps illustrated in FIG. 6. If barrier B1 is preserved, it will also enforce every instance of dependence relation d2 (as shown by the edge between d2 and B1). Since both dependence relations are enforced by barrier statement B1, the compiler does not have to soften barrier statement B2—it can instead remove barrier statement B2. Note, however, that reaching this solution is dependent upon evaluating dependence relation d1 prior to evaluating dependence relation d2. If, for example, dependence relation d2 is considered first, then either barrier B1 or barrier B2 could be selected to enforce dependence relation d2. If barrier B2 is selected to enforce dependence relation d2 and is also replaced with a point-to-point synchronization routine, then when dependence d1 is evaluated, it will be determined that the barrier B1 must also be maintained to enforce dependence d1. Accordingly, exemplary embodiments of the present invention analyze nonsoftenable dependence relations (filled-in circles in the barrier-dependence graphs) prior to analyzing softenable dependences in order to optimize resulting programs.

Figure 6:
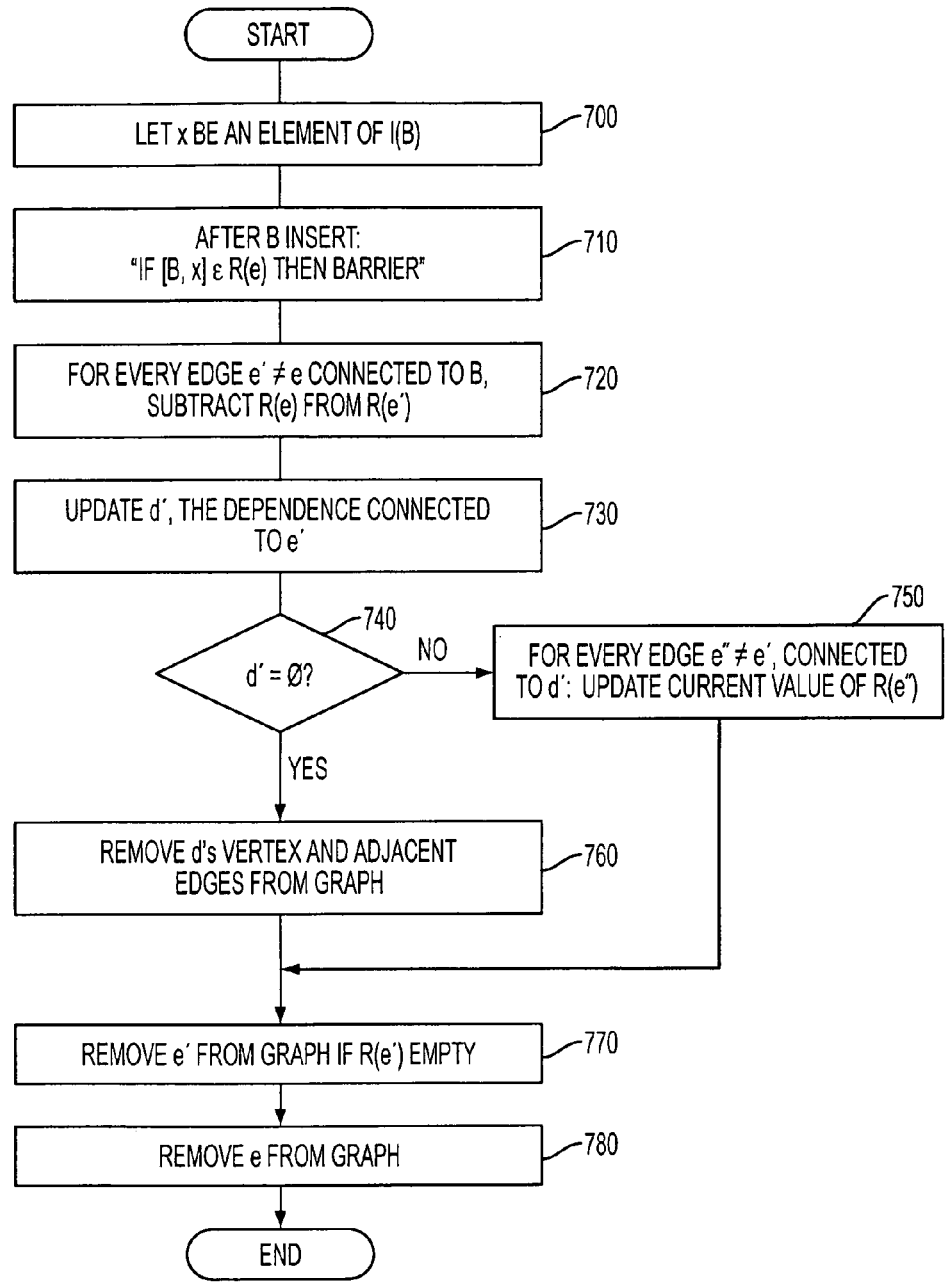
FIG. 6 is a flowchart illustrating another step of the method of FIG. 1 in more detail.

All of the nonsoftenable dependences identified in the graph can be evaluated using, for example, the technique described in FIG. 6. Then, any dependence relation or barrier vertices in the graph which have no remaining edges connected thereto are removed. At this point in the process, barrier statements have been identified to enforce all of the nonsoftenable dependence relations.

Returning to FIG. 1, the remaining task is to replace barriers which are not used to enforce nonsoftenable barriers with point-to-point synchronization routines at step 106. There are several approaches that can be used to perform this replacement step according to exemplary embodiments of the present invention. In the end, regardless of which approach is used, the barriers that have not been preserved for enforcement of the nonsoftenable dependences will have been removed from the code. In their places, Notify and Wait statements, possibly guarded by if statements, will have been inserted so as to enforce the softenable dependences that remain. One exemplary approach for performing these replacements to remove the residual barriers (i.e., those not in use for enforcing nonsoftenable dependences) first. Then for each softenable dependence d in turn, find the sets To(d, x, me) of threads that must wait for thread me at the iteration x according to dependence d, and From(d, x, me) of threads that thread me must wait for at iteration x according to dependence d, and insert just after the source statement S the code:

```
for each element me' in To (d, x, me) {
    Notify(Semaphore [d, me,me']);
}
``` and insert just before the destination statement T the code:

```
for each element me' in From(d, x, me) {
    Wait(Semaphore[d, me',me]);
}
``` where me' is the ID of the unique thread that thread me must wait for at the current iteration.

An alternative approach to performing replacement step 106 is to directly replace the barriers with notify/wait code as follows. For each barrier B (with iteration vector x) associated with a softenable dependence, the following steps can, for example, be performed to replace that barrier B with a point-to-point synchronization. For each dependence d from statement S to statement T enforced by B, i.e., such that (d,B)∈E, (1) compute To(B,d,x,me)={me': ∃i, i': [me,S,i]→[me',T,i'] ∈d, [B,x] ∈ R((d,B)), [me,S,i]<[B,x]<[me',T,i']}, (2) compute From(B,d,x,me)={me': ∃i, i': [me',S,i]→[me,T,i']∈d, [B,x]∈R((d,B)), [me',S,i]<[B,x]<[me,T,i']} and (3) just after barrier statement B in the program, insert the following code:

```
if [B,x] ∈ R((d,B)) {
    if To(B,d,x,me) not empty {
        for each element me' in To(B,d,x,me) {
            Notify (Semaphore [B, d, me, me']) ;
        }
    }
    if From(B,d,x,me) not empty {
        for each element me' in From(B,d,x,me) {
            Wait (Semaphore [B, d, me', me] ) ;
        }
    }
}
```

Notice that, to prevent a thread from waiting indefinitely for a semaphore to be set, this exemplary embodiment uses one semaphore per barrier and dependence being softened. Those skilled in the art will recognize that other embodiments in which there are fewer semaphores, for example, one for each pair (me, me') of threads in a dependence relation, are also possible. After the code is inserted, then the softenable barrier is removed from both the graph (list of barrier vertices) and the program by the compiler.

Note that all of the guards (the conditions in if tests) in code that is generated according to exemplary embodiments of the present invention can be simplified using systems such as the Omega system referred to above, which provide techniques, such as the Gist(p,q) function of Omega, that determine information provided by a Presburger formula p given that the formula q is known to be true. This can be used to eliminate redundant tests in any nested if construct.

Figure 7:
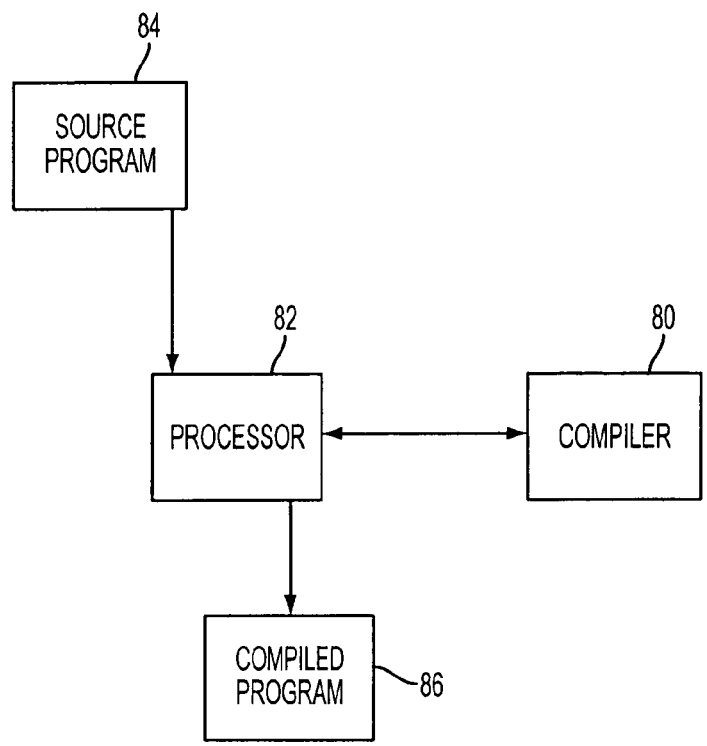
FIG. 7 conceptually illustrates operation of a compiler in accordance with exemplary embodiments of the present invention.

The foregoing techniques can be implemented in a compiler 80 operating on a processor 82 as shown conceptually in FIG. 7. Thus, a source program 84 is compiled using the compiler 80 running on processor 82, wherein exemplary compilers according to the present invention include code which implements the foregoing exemplary techniques or other techniques in accordance with the present invention. Accordingly, the compiled program 86 will have been modified relative to the source program 84 to selectively remove, replace or preserve barrier instructions as described herein.

Transitive Reduction

As mentioned above, the subset H of D which is used to construct the barrier dependence graph can be determined, at least in part, by performing a transitive reduction process on the set of dependence relations associated with a program being compiled. The following provides an exemplary transitive reduction process, however those skilled in the art will appreciate that the present invention is not so limited. Among other things, other techniques for transitive reduction can be employed or the entire set of inter-thread dependences can be used as set H.

The transitive reduction of a directed acyclic graph (or dag) G=(V,E) is the unique dag G'=(V,E'), where E' is the subset of E such that, for any edge e' in E', there is no path in E starting at tail(e') and arriving at head(e') that does not include e'. The transitive closure of a dag G=(V,E) is the unique dag G'=(V, E') such that E' includes an edge (u,v) if there is a path from u to v in G. As mentioned above, a relation is a set of ordered pairs, and thus any relation can be viewed as the set of edges of a directed graph. Since the pairs in a dependence relation are temporally ordered, there can be no cycles in a dependence relation. Therefore dependence relations can be viewed as the edge set of a directed acyclic graph. It is therefore proper to also consider the transitive closure and transitive reduction of a relation.

The transitive reduction of a relation R can be written as:

$$Red(R)=\{(x,y):(x,y)\in R, \neg (\bullet z:(x,z)\in R,(z,y)\in R^+)\}$$

where $R^+$ denotes the transitive closure of the relation R. Denoting set subtraction and relation composition (join) by \ and o, respectively, the definition above is equivalent to:

$$Red(R)=R\setminus(RoR^+)$$

The value $R^+$ can be difficult to compute. According to exemplary embodiments of the present invention, another means of determining a transitive reduction is used where E' is the subset of E such that, for any edge e' in E', there is no path of length 2 in E starting at tail(e') and arriving at head(e) that does not include e'. This form of transitive reduction can be expressed as:

$$Red2(R)=\{(x,y):(x,y)\in R,(x,z)\in R,(z,y)\in R)\}$$

or, equivalently, $$Red2(R)=R\setminus(RoR)$$

As mentioned above, this transitive reduction technique can be used to compute the set H of dependences as, for example:

$$H=(D\setminus(DoD))\cap\{m\to n:m,n\in I,\pi(m)\neq\pi(n)\}$$

This exemplary technique for performing a transitive reduction according to the present invention is an improvement over conventional techniques because it avoids the complexity and computational cost of computing the transitive closure as a step in computing the transitive reduction.

Consider again the first code example having dependences:

$$\{[T,me,t]\to[U,me+1,t']:1\leq me<P,1\leq t\leq t'\leq N\},$$

$$\{[U,me,t]\to[T,me-1,t']:1<me\leq P,1\leq t'\leq t\leq N\},$$

and $$\{[T,me,t]\to[T,me,t']:1\leq me\leq P,1\leq t\leq t\leq N\}$$

After applying transitive reduction using Red2(R), the remaining dependences are:

$$\{[T,me,t] \to [U,me+1,t]: 1 \leq t \leq N, 1 \leq me < P\},$$

and $$\{[U,me,t] \to [T,me-1,t+1]: 1 \leq t < N, 2 \leq me \leq P\},$$

The set H for code example 1 then consists of:

$$d1 = \{[T,me,t] \to [U,me+1,t]: 1 \leq t \leq N, 1 \leq me \leq P\}$$

and $$d2 = \{[U,me,t] \to [T,me-1,t+1]: 1 \leq t \leq N, 2 < me \leq P\}$$

Notation

The variable 'S' is used herein to denote a statement in a multithreaded parallel program. An instance of statement S is one dynamic execution of that statement. The "iteration vector" of S is the vector built of the counters of loops surrounding statement S. An instance s of statement S can therefore be unambiguously denoted by a tuple, s=[S,me,i], where 'me' is a thread ID value and 'i' is a value of the iteration vector of S. As mentioned earlier, for the purposes of this discussion, there are P threads and thread ID me is valid if $1 \leq me \leq P$. Each statement instance s executes on thread π(s). The set of instances of a statement S is called the "iteration domain" of S and is denoted I(S). 'I' denotes the union (∪) of all I(S)'s over all S's. For example, in code example 1 above, I={[T, me,t]:$1 \leq me \leq P, 1 \leq t \leq N$}∪{[U,me,t]:$1 \leq me \leq P, 1 \leq t \leq N$}. If a statement instance 'm' executes before an instance 'n', it is denoted m<n. Execution order is the same as sequential execution order if m and n are on the same thread (π(m)=π(n)); on the other hand, it is a result of synchronization primitives if m and n are on different threads. A statement n is dependent on a statement m if (1) m and n access the same memory location, (2) at least one of m and n is a write instruction and (3) if m<n. A barrier statement B enforces a dependence from a statement S to a statement T if there are bs, bt, s and t, instances of B, B, S and T respectively, such that there is a dependence from s to t, and s<bs~bt<t, where pi(s)=pi(bs), and pi(t)=pi(bt), and bs bt denotes the fact that the two instances of B in fact synchronize with one another.

To simplify this description it is assumed that each statement S contains at most one reference to a shared variable; however this is not a requirement for exemplary embodiments of the present invention. Statements which contain more than one reference to a shared variable can be broken down into multiple statements with one such reference by copying the shared values to a local temporary variable. Additionally, it is assumed that a barrier statement either enforces all the dependences from instances of S to that of T, or none and that, given a dynamic instance of a barrier, either all processors execute it, or none do. However, those skilled in the art will appreciate that the present invention is not dependent upon these assumptions.

Systems and methods for processing data according to exemplary embodiments of the present invention can be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention.

Those skilled in the art will also appreciate that point-to-point synchronization may be implemented by techniques other than using shared variables (semaphores) and that the use of semaphores in the exemplary embodiments described herein is purely illustrative. For example, a counter can be used rather than a (Boolean) semaphore variable.

The above-described exemplary embodiments are intended to be illustrative in all respects, rather than restrictive, of the present invention. Thus the present invention is capable of many variations in detailed implementation that can be derived from the description contained herein by a person skilled in the art. Various alternatives are also contemplated by exemplary embodiments of the present invention. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. A method for modifying a program having a plurality of barrier statements comprising:
   identifying dependence relations between statements in the program and enforcement associations between said barrier statements and said dependence relations;
   classifying said dependence relations as being either of a first type, which are enforceable by point-to-point synchronization or of a second type, which are not enforceable by point-to-point synchronization;
   determining a subset of said plurality of barrier statements which will enforce said dependence relations of said second type; and
   replacing at least one of said plurality of barrier statements, which is not in said subset, with a point-to-point synchronization;
   wherein, for each dependence relation, said classifying comprises:
      projecting said dependence relation onto each thread in the program to generate a projection relation; and
      determining, for each thread in the projection relation, whether there is at most one other thread on which said thread depends by computing an inverse of said projection relation, composing said inverse of said projection relation with said projection relation, and subtracting a result of said composing step with an identity relation.

2. The method of claim 1, wherein classifying said dependence relations as being either of said first type or of said second type further comprises, for each dependence relation:
   if there is at most one other thread on which said thread depends, identifying said dependence relation as being of said first type; and
   otherwise, identifying said dependence relation as being of said second type.

3. The method of claim 1, wherein said step of identifying dependence relations between statements in the parallel program further comprises the steps of:
   identifying a first subset of said dependence relations by transitively reducing said dependence relations; and
   removing intra-thread dependence relations from said first subset to create a second subset of said dependence relations.

4. The method of claim 3, wherein said step of transitively reducing said dependence relations further comprises the step of:

computing H=(D\(DoD)), wherein D is a set of dependence relations identified for said parallel program, "\" denotes set subtraction, "o" denotes set composition, and H is a resulting, transitively reduced set based on D.

5. The method of claim 1, wherein said method of modifying said program is performed by a compiler.

6. The method of claim 5, wherein said compiler further performs the steps of:

constructing a first list of said dependence relations identified within said program;
constructing a second list of barrier statements identified within said program; and
constructing a third list of barrier-dependence associations identified within said program, wherein said barrier-dependence associations each refer to an instance of one of said barrier statements in said second list enforcing a subset of one of said dependence relations in said first list.

7. A computer-readable medium containing instructions which, when executed on a computer, perform the steps of:

identifying dependence relations between statements in a program and enforcement associations between said barrier statements and said dependence relations;
classifying said dependence relations as being either of a first type, which are enforceable by point-to-point synchronization or of a second type, which are not enforceable by point-to-point synchronization;
determining a subset of said plurality of barrier statements which will enforce said dependence relations of said second type; and
replacing at least one of said plurality of barrier statements, which is not in said subset, with a point-to-point synchronization routine;
wherein identifying dependence relations between statements in the program further comprises identifying a first subset of said dependence relations by transitively reducing said dependence relations; and
wherein transitively reducing said dependence relations further comprises computing H=(D\(DoD)), wherein D is a set of dependence relations identified for said parallel program, "\" denotes set subtraction, "o" denotes set composition and H is a resulting, transitively reduced set based on D.

8. The computer-readable medium of claim 7, wherein said step of classifying said dependence relations as being either of said first type or said second type further comprises, for each dependence relation, the steps of:

projecting said dependence relation onto each thread in the parallel program to generate a projection relation;
determining, for each thread in said projection relation, whether there is at most one other thread on which said thread depends;
if so, identifying said dependence relation as being of said first type; and
otherwise, identifying said dependence relation as being of said second type.

9. The computer-readable medium of claim 8, wherein said step of determining, for each thread in said projection relation, whether there is at most one other thread on which said thread depends further comprises the steps of:

computing an inverse of said projection relation;
composing said inverse of said projection relation with said projection relation; and
subtracting a result of said composing step with an identity relation.

10. The computer-readable medium of claim 7, wherein said step of identifying dependence relations between statements in the parallel program further comprises:

removing intra-thread dependence relations from said first subset to create a second subset of said dependence relations.

11. The computer-readable medium of claim 7, wherein said steps are performed by a compiler.

12. The computer-readable medium of claim 11, wherein said compiler further performs the steps of:

constructing a first list of said dependence relations identified within said program;
constructing a second list of barrier statements identified within said program; and
constructing a third list of barrier-dependence associations identified within said program, wherein said barrier-dependence associations each refer to an instance of one of said barrier statements in said second list enforcing a subset of one of said dependence relations in said first list.

13. A system for modifying a source program having a plurality of barrier statements comprising:

a set of data structures which identify dependence relations between statements in the source program, and enforcement associations between said barrier statements and said dependence relations; and
a processor operating on said set of data structures to classify said dependence relations as being either of a first type, which are enforceable by point-to-point synchronization, or of a second type which are not enforceable by point-to-point synchronization, to determine a subset of said plurality of barrier statements which will enforce said dependence relations of said second type, and to replace at least one of said plurality of barrier statements, which is not in said subset, with a point-to-point synchronization routine;
wherein said processor classifies said dependence relations as being either of said first type or said second type, for each dependence relation, by:
projecting said dependence relation onto each thread in the source program to generate a projection relation; and
determining, for each thread in said projection relation, whether there is at most one other thread on which said thread depends by computing an inverse of said projection relation, composing said inverse of said projection relation with said projection relation, and subtracting a result of said composing step with an identity relation.

14. The system of claim 13, wherein said processor classifies said dependence relations as being either of said first type or said second type, for each dependence relation, by:

if there is at most one other thread on which said thread depends, identifying said dependence relation as being of said first type; and
otherwise, identifying said dependence relation as being of said second type.

15. The system of claim 13, wherein processor identifies dependence relations between statements in the source program by:

identifying a first subset of said dependence relations by transitively reducing said dependence relations; and
removing intra-thread dependence relations from said first subset to create a second subset of said dependence relations.

16. The system of claim 15, wherein said processor transitively reducing said dependence relations by:
computing $H=(D\backslash(DoD))$, wherein D is a set of dependence relations identified for said parallel program, "\" denotes set subtraction, "o" denotes set composition, and H is a resulting, transitively reduced set based on D.

17. The system of claim 13, wherein said processor of modifies said source program in conjunction with a compiler.

18. The system of claim 17, wherein said compiler constructs said data structures by:
constructing a first list of said dependence relations identified within said program;
constructing a second list of barrier statements identified within said program; and
constructing a third list of barrier-dependence associations identified within said program, wherein said barrier-dependence associations each refer to an instance of one of said barrier statements in said second list enforcing a subset of one of said dependence relations in said first list.

19. A system for modifying a source program having a plurality of barrier statements comprising:
a set of data structures which identify dependence relations between statements in the source program, and enforcement associations between said barrier statements and said dependence relations; and
a processor operating on said set of data structures to classify said dependence relations as being either of a first type, which are enforceable by point-to-point synchronization, or of a second type which are not enforceable by point-to-point synchronization, to determine a subset of said plurality of barrier statements which will enforce said dependence relations of said second type, and to replace at least one of said plurality of barrier statements, which is not in said subset, with a point-to-point synchronization routine;
wherein the processor identifies dependence relations between statements in the source program by identifying a first subset of said dependence relations by transitively reducing said dependence relations, and wherein transitively reducing said dependence relations comprises computing $H=(D\backslash(DoD))$, wherein D is a set of dependence relations identified for said parallel program, "\" denotes set subtraction, "o" denotes set composition and H is a resulting, transitively reduced set based on D.

20. The system of claim 19 the processor further identifies the dependence relations by removing intra-thread dependence relations from said first subset to create a second subset of said dependence relations.

* * * * *

UNITED STATES PATENT AND TRADEMARK OFFICE
CERTIFICATE OF CORRECTION

PATENT NO. : 8,392,900 B1
APPLICATION NO. : 11/082321
DATED : March 5, 2013
INVENTOR(S) : Jean-Francois Collard et al.

Page 1 of 1

It is certified that error appears in the above-identified patent and that said Letters Patent is hereby corrected as shown below:

In the Claims

In column 15, line 7, in Claim 17, after "processor" delete "of".

Signed and Sealed this
Seventeenth Day of September, 2013

Teresa Stanek Rea
*Deputy Director of the United States Patent and Trademark Office*